(12) United States Patent
Bogenrieder et al.

(10) Patent No.: US 8,777,261 B2
(45) Date of Patent: Jul. 15, 2014

(54) RESTRAINT DEVICE, IN PARTICULAR FOR A MOTOR VEHICLE

(75) Inventors: Ralf Bogenrieder, Stuttgart (DE); Christian Burczyk, Stuttgart (DE); Andreas Hirth, Dielheim (DE); Lutz Quarg, Boeblingen (DE); Friedrich Reiter, Sindelfingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/703,526

(22) PCT Filed: Mar. 22, 2011

(86) PCT No.: PCT/EP2011/001404
§ 371 (c)(1),
(2), (4) Date: Dec. 11, 2012

(87) PCT Pub. No.: WO2011/157310
PCT Pub. Date: Dec. 22, 2011

(65) Prior Publication Data
US 2013/0087996 A1    Apr. 11, 2013

(30) Foreign Application Priority Data
Jun. 17, 2010    (DE) .......................... 10 2010 024 183

(51) Int. Cl.
*B60R 21/16*    (2006.01)
(52) U.S. Cl.
USPC ...................................................... 280/743.1
(58) Field of Classification Search
USPC .......................................... 280/743.1, 743.2
See application file for complete search history.

(56) References Cited

U.S. PATENT DOCUMENTS

| 3,970,328 | A | 7/1976 | Wallsten |
| 7,025,376 | B2 * | 4/2006 | Dominissini .................. 280/729 |
| 7,404,575 | B2 * | 7/2008 | Bito et al. .................. 280/743.1 |
| 8,523,223 | B2 * | 9/2013 | Miyata .......................... 280/732 |
| 2002/0105171 | A1 | 8/2002 | Fellhauer et al. |
| 2006/0249934 | A1 | 11/2006 | Hasebe |
| 2010/0230941 | A1 | 9/2010 | Hirth et al. |
| 2011/0049846 | A1 | 3/2011 | Hirth et al. |

FOREIGN PATENT DOCUMENTS

| DE | 201 02 115 U1 | 8/2001 |
| DE | 10 2007 022 925 A1 | 11/2008 |
| DE | 10 2007 052 246 A1 | 5/2009 |
| EP | 1 300 300 A1 | 4/2003 |
| EP | 1 350 689 A2 | 10/2003 |
| EP | 1 498 320 A2 | 1/2005 |
| WO | WO 2008/111881 A1 | 9/2008 |

OTHER PUBLICATIONS

International Search Report with English translation dated Aug. 23, 2011 (six (6) pages).

* cited by examiner

*Primary Examiner* — Faye M. Fleming
(74) *Attorney, Agent, or Firm* — Crowell & Moring LLP

(57) ABSTRACT

A restraint device for a motor vehicle includes a support structure with a plurality of structural elements in which the support structure can be moved from a stowage position into a restraint position. The restraint device also includes a covering by means of which a restraint volume formed by the support structure in its restraint position is surrounded. At least one support element is provided by means of which at least one of the structural elements of the support structure is held in a predetermined form and/or position at least in the restraint position.

8 Claims, 8 Drawing Sheets

RESTRAINT DEVICE, IN PARTICULAR FOR A MOTOR VEHICLE

BACKGROUND AND SUMMARY OF THE INVENTION

Exemplary embodiments of the present invention are directed to a restraint device for a motor vehicle.

German Patent Documents DE 10 2007 052 246 A1 and DE 10 2007 022 925 A1 disclose restraint devices in the form of airbags that comprise a support structure moveable from a stowage position into a restraint position. This support structure is formed from a plurality of flexible tubular elements which, when triggered in an accident, are filled with a medium and thereby unfolded or increased in volume. A covering, which is arranged outside or inside the supporting structure or which fills individual partitions between the individual tubular elements of the support structure, is unfolded together with the support structure as the latter is transferred from the stowage position into the restraint position and surrounds a restraint volume. In order to ensure that the covering can unfold quickly and that a partial vacuum is not generated within the restraint volume, at least one ventilation opening is provided within the covering, via which opening a medium, in particular ambient air, can enter the covering during the movement into the restraint position. As soon as the restraint device is in its restraint position, a person hitting the device is essentially accommodated by the corresponding displacement of the medium, in particular the ambient air, within the restraint volume.

In order to protect a person in an accident as well as possible by means of the restraint device, it is advantageous if the person is already supported after covering a relatively short distance.

The present invention is therefore directed to a restraint device in which the support structure allows the person to be caught very efficiently.

A restraint device according to the invention, in particular for a motor vehicle and especially for a car, which comprises a support structure with a plurality of structural elements, which support structure can be moved from a stowage position into a restraint position, and which further comprises a covering by means of which a restraint volume formed by the support structure in its restraint position is surrounded, includes at least one support element by means of which at least one of the structural elements of the support structure is held in a predetermined form and/or position at least in the restraint position. As a result, the support structure can, in an accident, catch and support a person hitting the support structure in an interior of the motor vehicle particularly efficiently, because the person has to plunge into the support structure or the structural elements only very slightly before the support structure offers a sufficiently strong resistance to restrain the person.

In this process, a sufficiently high internal pressure for supporting the person builds up in the restraint volume after a very short plunging distance into the support structure or the structural elements. This is due to the fact that the at least one structural element is held in the predetermined form and/or position by the support element and is thereby preloaded and reinforced in the predetermined form and/or position, which facilitates the restraining function of the restraint device. In other words, the structural element or the surfaces of the structural element that are impacted by the person in the accident is/are already preloaded towards the restraint position before the person impacts the support structure or the structural element, whereby the internal pressure in the restraint volume is increased. The surfaces of the structural element are, for example, curved inwards, i.e., into the restraint volume. Without the support element, the surfaces could be curved outwards, i.e., away from the restraint volume into the passenger compartment of the motor vehicle, so that the surfaces first have to be curved inwards before a sufficiently high internal pressure for restraining, catching or supporting the person is built up in the restraint volume.

As the surfaces are already curved inwards by the support element before the person hits the support structure, the internal pressure is high enough to restrain the person after a short time, i.e., after a short plunging distance. The restraint device according to the invention therefore offers a very good restraining function, which allows the person to be caught after a very short distance. This avoids or at least reduces the probability of injuries in an accident.

In an advantageous embodiment of the invention, the support element is designed as a strap element, in particular as a retaining strap, by means of which the structural element is preloaded and thereby held in an advantageous predetermined form and/or position. By means of the retaining strap, the shape and in particular an external contour of the structural element can be adjusted such that the internal pressure is high enough to support the person in an accident after a very short plunging distance.

Alternatively, the support element can be designed as a seam by means of which darts are formed in parts of the volume element. Such darts can likewise hold and preload the support element in the predetermined position and in particular in the predetermined form, resulting in a very good restraining function of the restraint device.

If designed as a strap element or a seam in particular, the support element makes it possible to divide at least parts of an internal volume of the structural element which has to be filled with a medium, in particular gas, i.e., inflated, in order to move the support structure into the restraint position, into smaller individual volumes, wherein such an individual volume may, for example, act together with a gas generator. The gas generator fills the internal volume of the support element with gas in order to increase the volume. Initially, the gas generator blows the gas into the smaller individual volume, which therefore acts as a gas generator chamber with a smaller volume. Due to its small volume, this individual volume acting as gas generator chamber can be filled with gas and therefore inflated particularly fast, resulting in a particularly fast movement of the support structure into the restraint position. This benefits the restraining function of the restraint device, because the person can be caught by the support structure within a particularly short time in an accident after a motor vehicle hits a barrier.

In this way, the support element allows a simple connection of the gas generator to at least almost any position of the restraint device, the gas generator being in particular held on a housing of the restraint device. At least parts of the support structure are accommodated in this housing in the stowage position. The gas generator, for example, fills the structural element or the individual volume with gas via at least one through-opening in a wall, in particular in a base, a side wall or an edge, of the housing. Alternatively, the gas generator can be mounted in any other position, thereby supplying gas to a structural element which—at least in the restraint position—is not in close proximity to the housing. In other words: the support element allows the airbag to be filled efficiently and effectively, in particular due to an expedient shaping of the structural element, the form and/or position of which can be adjusted for efficient and effective gas filling by the support element.

The support element further reduces resistances, in particular flow resistances, of the restraint device, so that the support structure can be moved into the restraint position particularly fast. This is accompanied by good gas distribution and distribution of forces as the support structure moves into the restraint position. As a result, the support structure can have a minimum wall thickness and/or be made of a particularly light-weight material. The support structure therefore has a very low weight, which further facilitates a fast movement into the restraint position with a further beneficial effect on the restraining function of the restraint device.

The support element can be sewn and/or bonded to the structural element and/or be designed as an insert part that is installed into the internal volume of the structural element. The support element is therefore joined to the structural element in a cost-effective way. The bonding and/or sewing process further allows a seam to be adjusted to requirements particularly easily, so that the structural element can be held in a particularly advantageous position and/or form that may have a complex geometry.

In a particularly advantageous embodiment of the invention, the support element is substantially designed as a tubular, inherently rigid support element. In this way, it is designed analogous to a so-called stent. Such a stent as known from human medicine is a support for blood vessels, which in human medicine is installed into hollow organs and in the restraint device according to the invention into the internal volume of the structural element in order to keep the hollow organ or the structural element respectively open. This may, for example, be a small tubular lattice made of metal or a plastic material. The support element therefore prevents an undesirable folding or kinking of the structural element—advantageously already in the stowage position of the support structure, so that the structural element and the support structure can be filled with gas and the filling of the structural element and the support structure is not impeded by such a fold or kinking.

Due to the fact that the support element facilitates a particularly effective and efficient movement of the support structure into the restraint position, for example as a result of the filling of the structural element(s) or the support structure with gas, and that a folding or kinking is avoided, the structural element or the support structure respectively can be produced as a cheap so-called two-dimensional (2D) structure that requires very little space in the stowage position. Thus, the structural element can be formed, for example, from only two fabric mats that extend substantially parallel to each other and which are, for example, sewn flat together in edge regions, so that the internal volume of the structural element can be filled with the gas between the seams. Further fabric elements, in particular fabric mats that extend at an angle, in particular at right angles, to the above fabric mats are therefore not provided.

These additional fabric elements are, for example, used to form a so-called three-dimensional (3D) structure, so that the structural element even in the stowage position has a shape that is identical or at least similar to its shape in the restraint position, in which the internal volume is filled with the medium, in particular gas. A 3D structure of the structural element formed in this way likewise prevents folding or kinking and therefore facilitates an effective and efficient movement of the support structure into the restraint position while at the same time meaning that the structural element and thus the entire support structure requires much space, particular in the stowage position, and is moreover heavy.

The support element makes it possible to design the structural element and the support structure as a whole as a very light-weight 2D structure that requires very little space while providing for a very effective and efficient movement into the restraint position because folds and kinking are avoided.

Further advantages, features and details of the invention can be derived from the following description of preferred embodiments and from the drawing. The features and feature combinations mentioned in the above description and the features and feature combinations mentioned below in the description of the figures and/or shown in the figures only can be used not only in the specified combination but also in other combinations or individually without leaving the scope of the invention.

BRIEF DESCRIPTION OF THE DRAWING FIGURES

Figure 7:
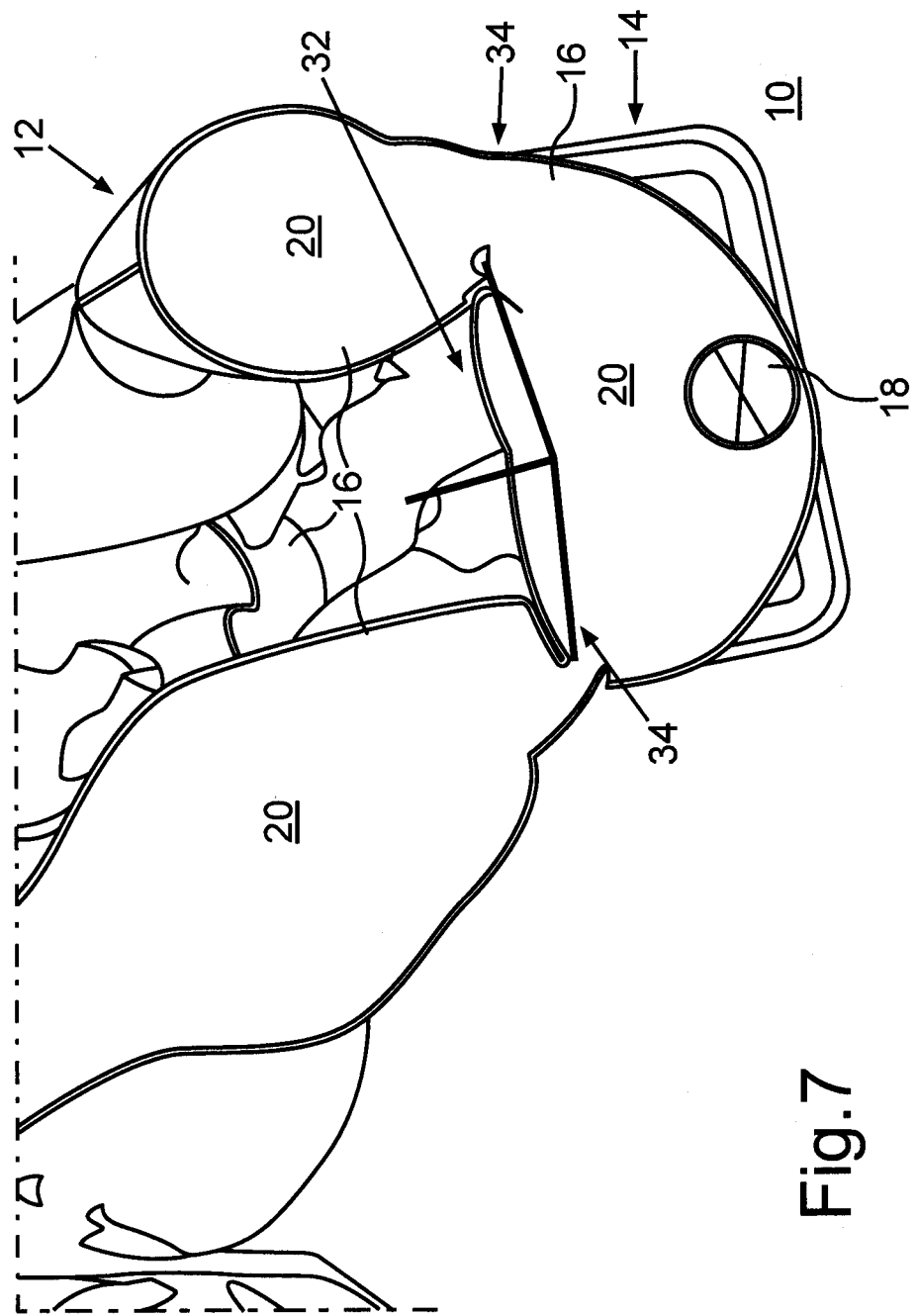
Figure 8:
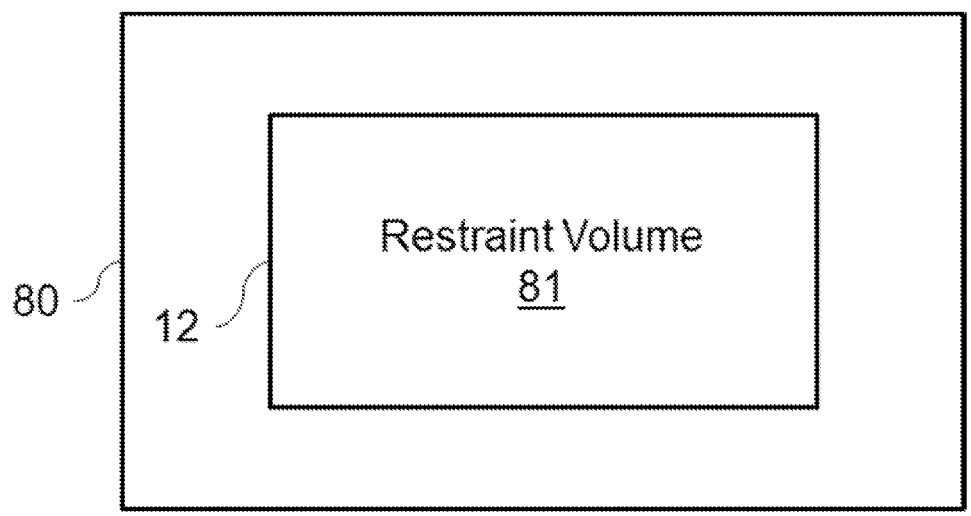

FIG. 7 is a diagrammatic and perspective cross-sectional view of a section of a further embodiment of the restraint device according to the preceding figures, wherein restraining straps are provided to hold the structural elements in a predetermined form in order to reduce the internal volume of the structural elements; and FIG. 8 is a highly schematic view of a covering surrounding a restraint volume formed by a support structure.

DETAILED DESCRIPTION

Figure 1:
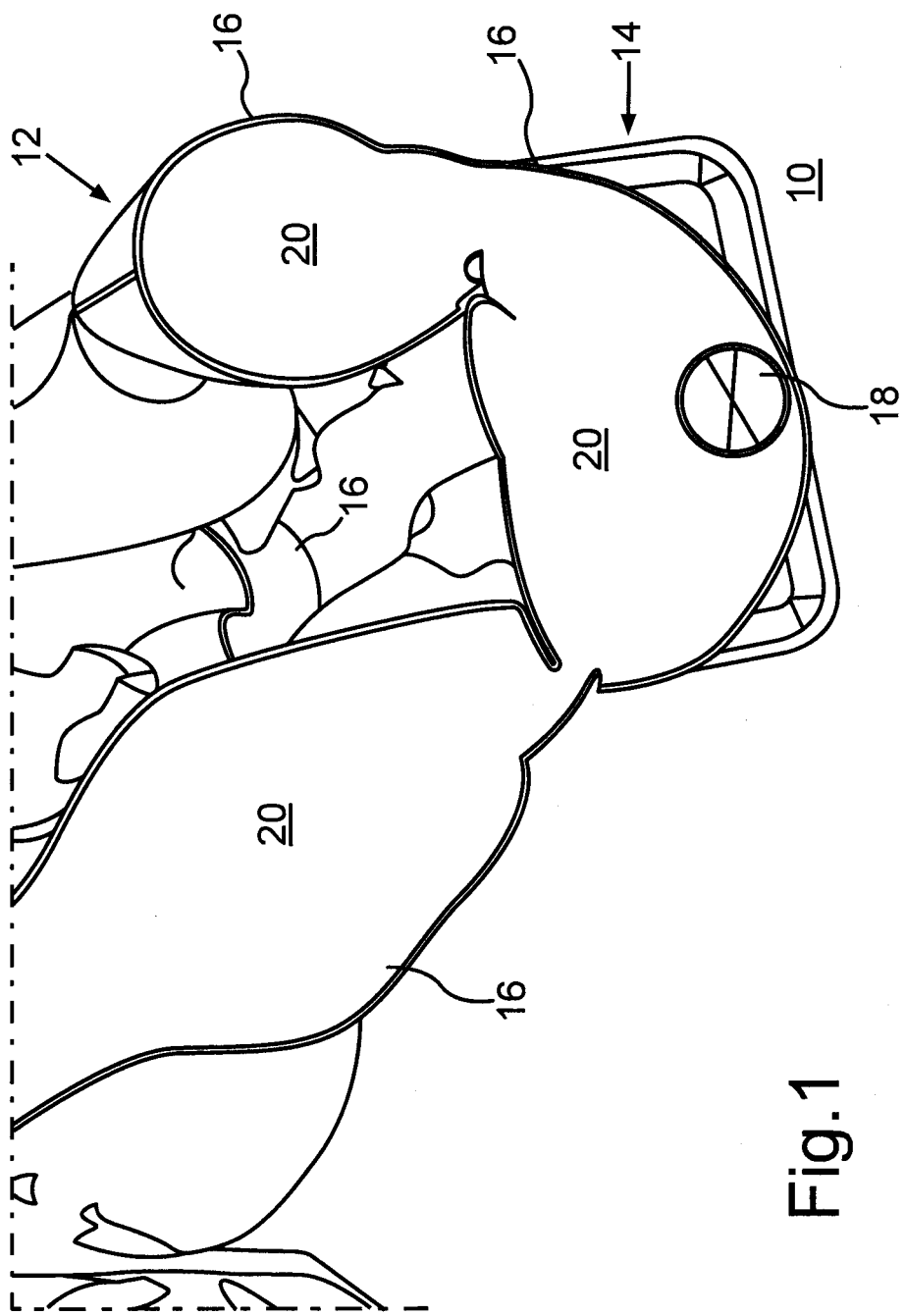
FIG. 1 is a diagrammatic and perspective cross-sectional view of a section of a restraint device for a car, comprising a support structure that is moved from a stowage position into a restraint position by filling structural elements of the support structure with gas by means of a gas generator.

FIG. 1 shows a restraint device in the form of a so-called truss bag 10 for a car, which comprises a truss-like support structure 12 and a housing 14. The truss-like support structure 12 comprises a plurality of structural elements 16, which are substantially tubular and provide a truss-like shape to the support structure 12 in a restraint position. In a stowage position, the support structure 12 is folded and accommodated in the housing 14.

In a car accident in which the car, for example, hits a barrier head-on, the structural elements 16 are filled with gas by means of a gas generator 18. In this process, the gas generator 18 blows gas into corresponding internal volumes 20 of the tubular elements 16, so that the support structure 12 is inflated from its stowage position into its restraint position. In the restraint position, the support structure 12 encloses a restraint volume, and at least parts of the support structure are placed in a covering that surrounds the restraint volume. FIG. 8 is a highly schematic view of a covering 80 surrounding a restraint volume 81 formed by the support structure 12. The truss bag offers the great advantage that the sum of the internal volumes 20 of the structural elements 16 or the support structure 12, respectively that have to be inflated is smaller than the restraint volume of the stretched support structure 12. As a result, the support structure 12 can be moved into the restraint position and simultaneously cover a large volume in a passenger compartment of the car, so that a person sitting in the passenger compartment can be caught and restrained particularly well in an accident.

As the support structure 12 moves into the restraint position, the restraint volume is filled with a gas, in particular with ambient air, through suitable ventilation openings in the covering and/or in walls of the housing 14, because the gas, in particular the ambient air, is drawn into the restraint volume via the ventilation openings by a partial vacuum generated by the movement of the support structure into the restraint position. There is no provision for actively filling the restraint volume with a gas, in particular ambient air, for example by means of a gas generator.

Figure 6:
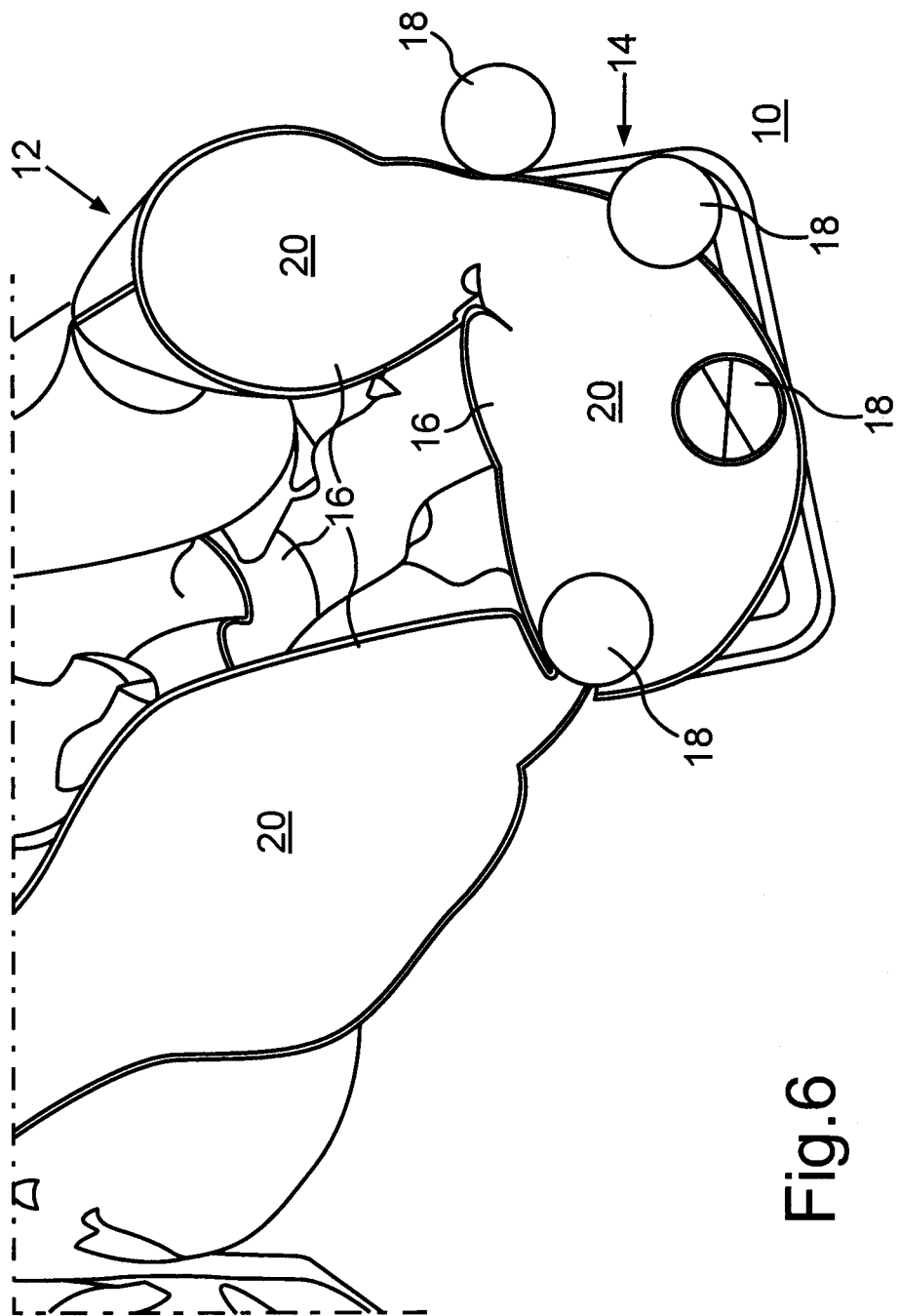
FIG. 6 is a diagrammatic and perspective cross-sectional view of a section of an alternative embodiment of the restraint device according to the preceding figures, showing possible positions of the gas generator.

As FIG. 1 shows, the gas generator 18 is secured to the housing 14 and in particular to a base of the housing 14, for example by means of a bracket and a bolt. In this context, FIG. 6 shows possible positions of the gas generator 18 with respect to the housing 14 of the truss bag 10.

Figure 2:
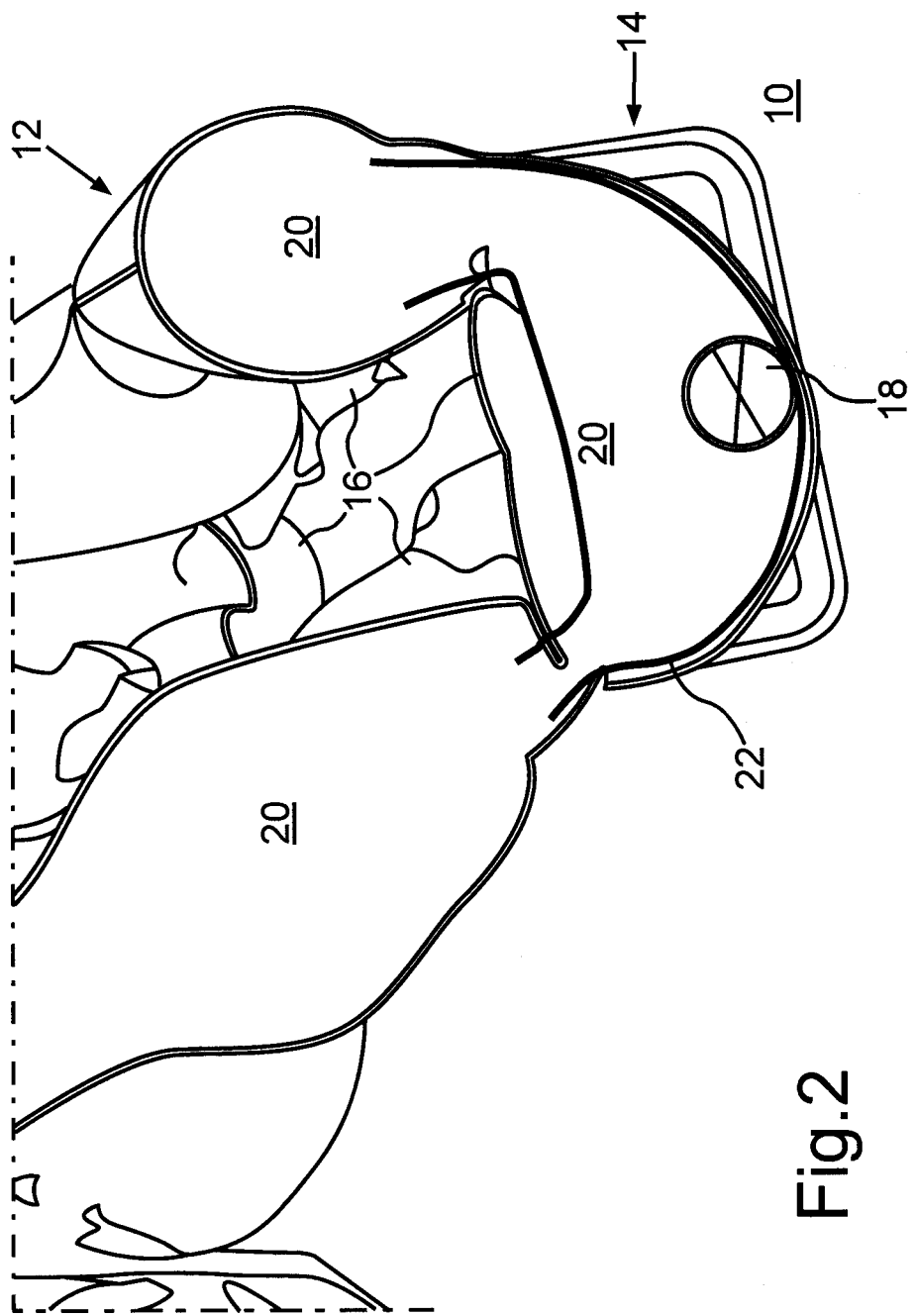
FIG. 2 is a diagrammatic and perspective cross-sectional view of a section of a further embodiment of the restraint device according to FIG. 1, wherein an insert part is installed into the structural elements to protect against heat and to increase their strength.

FIG. 2 shows the truss bag 10, which now includes an insert part 22 in the internal volumes 20 of the structural elements 16. The insert part 22 acts as a heat shield. The insert part 22 further holds the structural elements 16 in a predetermined form, in particular already in the stowage position of the support structure 12, in order to prevent an undesirable folding or kinking of the structural elements 16. Such a kinking could slow down or even prevent the inflation of the internal volumes 20 and therefore the movement of the support structure 12 into the restraint position; this is prevented by the insert part 22. For this purpose, the insert part 22 is designed, for example, as a so-called stent that holds at least parts of the internal volumes 20 open in the stowage position and in particular ensures a transfer of the gas from the internal volume 20, into which the gas generator 18 blows the gas directly, into internal volumes 20 that are in fluidic communication with this internal volume 20.

Figure 3:
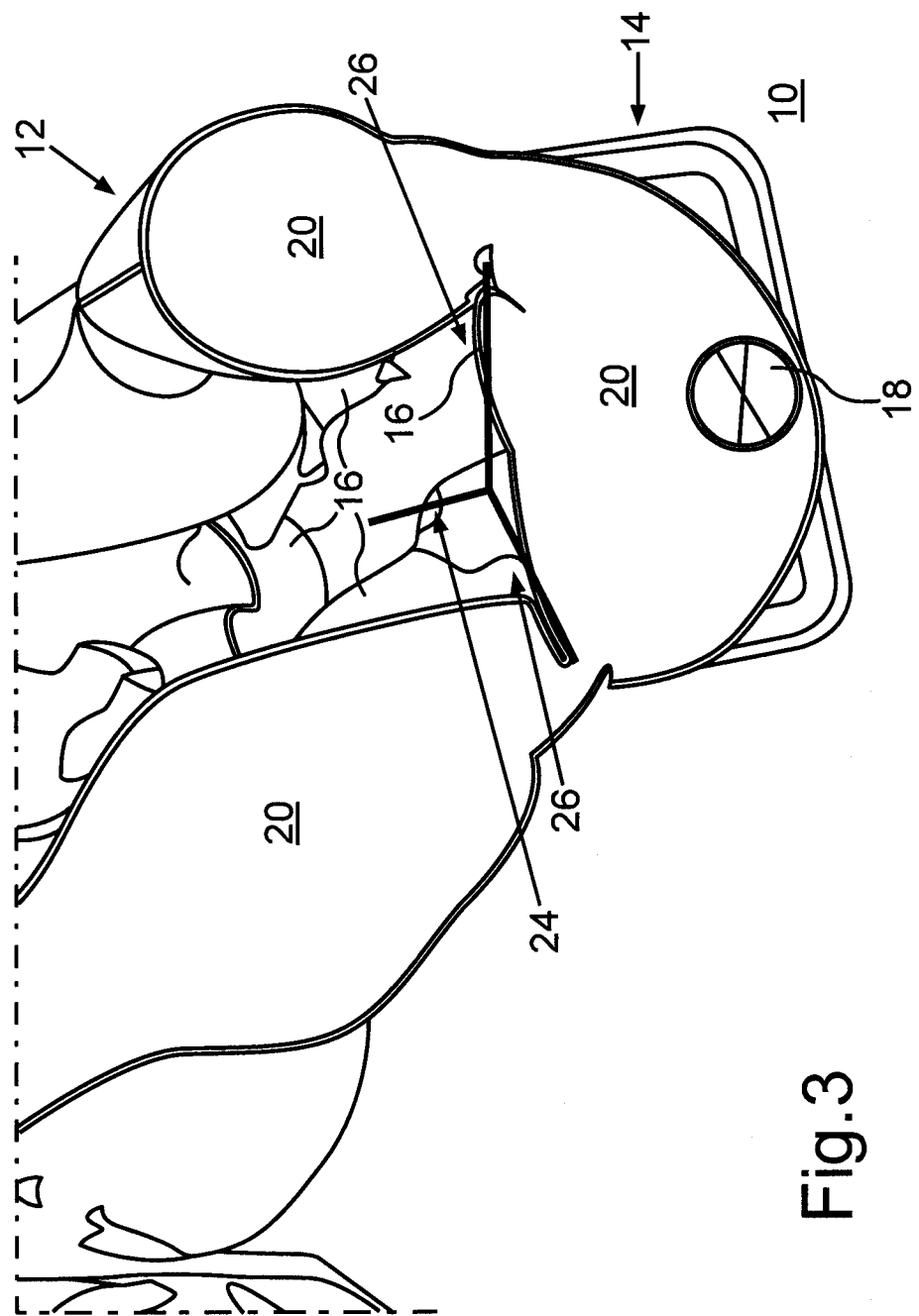
FIG. 3 is a diagrammatic and perspective cross-sectional view of a section of an embodiment of the restraint device according to the preceding figures, wherein a restraining strap with darts is provided, by means of which the structural elements are held in a predetermined form.

FIG. 3 shows a truss bag 10 that comprises a restraining strap 24 with darts 26. Like the insert part 22, the restraining strap 24 with the darts 26 holds the structural element 16 in a predetermined form, so that an effective and efficient movement of the support structure 12 into the restraint position is ensured on the one hand and the structural elements 16 and therefore the support structure 12 are reinforced and preloaded in the restraint position on the other hand. As a result, in a collision the person involved can be caught after covering a very short plunging distance into the support structure 12, because, due to the preload, a sufficiently high internal pressure is built up in the restraint volume even after a very short plunging distance in order to offer the person enough resistance in order to catch and support him/her.

Figure 4:
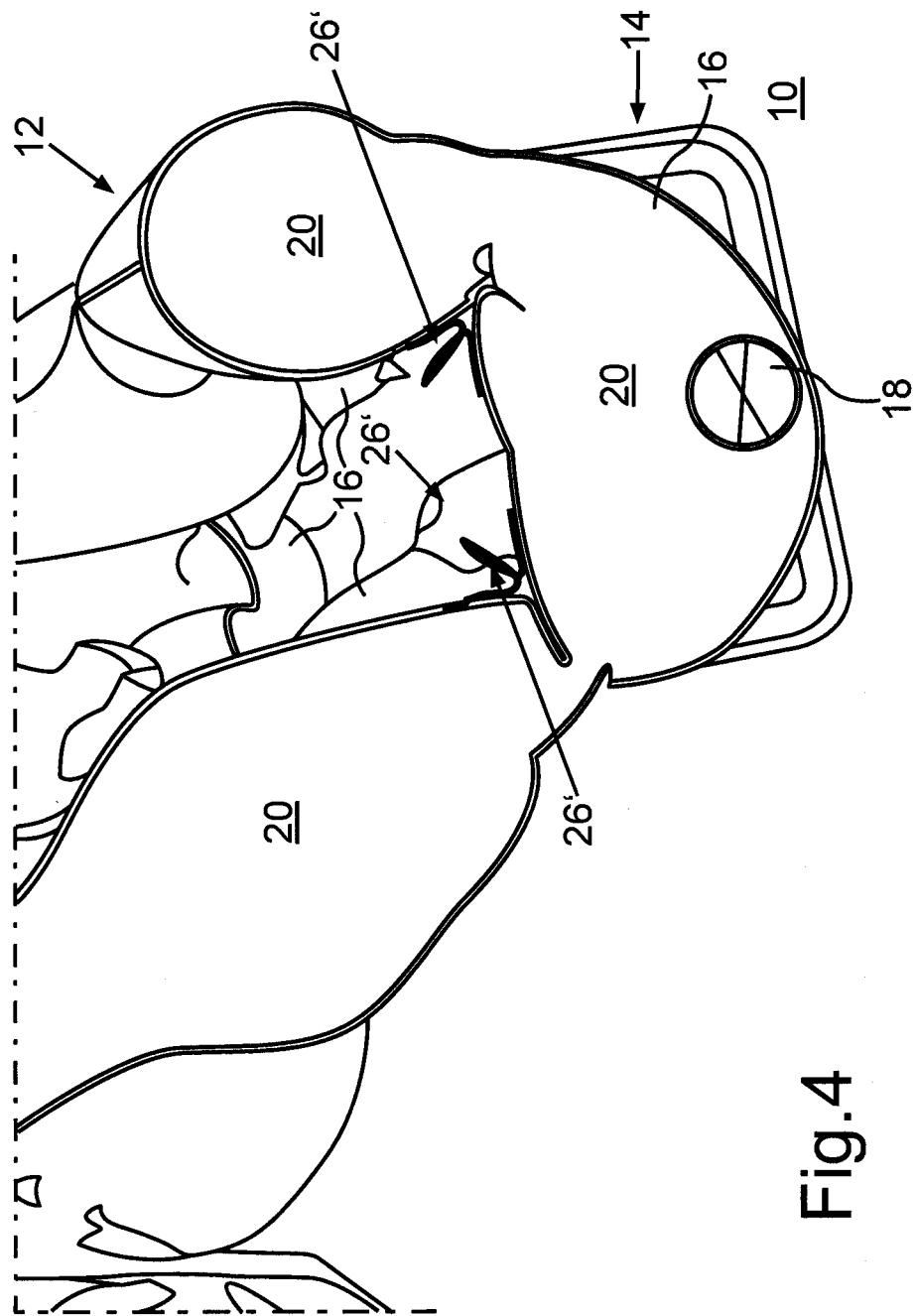
FIG. 4 is a diagrammatic and perspective cross-sectional view of a section of a further embodiment of the restraint device according to the preceding figures, wherein darts are provided to hold the structural elements in a predetermined form.

FIG. 4 shows the truss bag 10 with darts 26' that, like the restraining strap 24 and the darts 26, are used to preload and reinforce the support structure 12 and to hold the structural elements 16 in a predetermined form. This offers the advantages already described in the context of FIG. 3; the support structure 12 is moved into the restraint position particularly fast and efficiently, and the person is caught after plunging only a short distance into the support structure 12.

Figure 5:
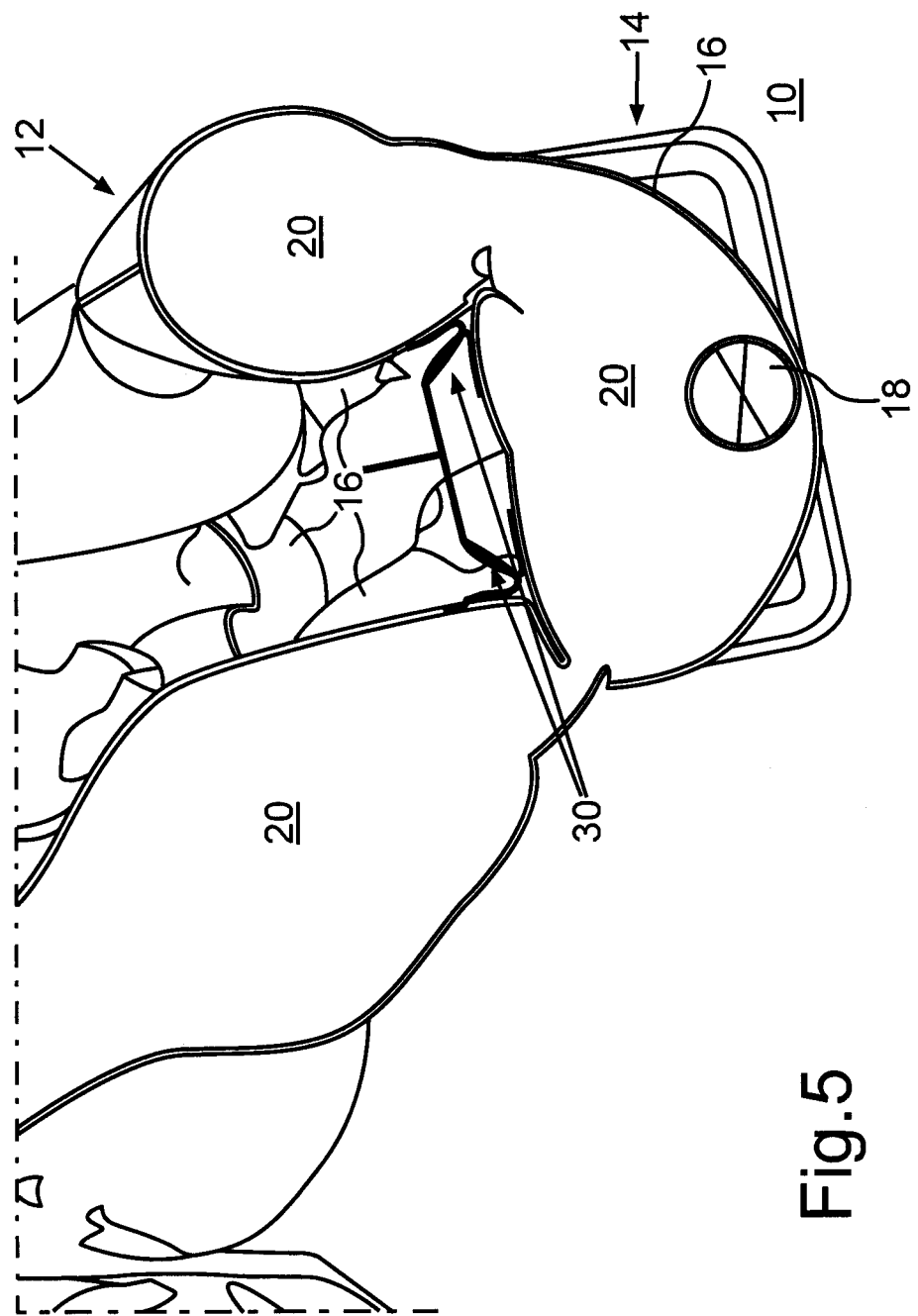
FIG. 5 is a diagrammatic and perspective cross-sectional view of a section of a further embodiment of the restraint device according to the preceding figures, wherein darts and bonded patches are provided to hold the structural elements in a predetermined form.

FIG. 5 shows the truss bag 10 with darts and bonded patches 30. The darts and bonded patches 30 reduce, while the support structure 12 moves into the restraint position and in the restraint position itself, an excess length between the structural elements 16, so that they can be inflated efficiently and are held in the predetermined position to provide a good restraint function of the truss bag 10.

FIG. 7 shows the truss bag 10 with anchor straps 32, by means of which the internal volume 20 of the structural element 16 that is inflated directly by the gas generator 18 as well as its expansion while the support structure 12 moves into the restraint position are limited. This results in optimized flow cross-sections to allow an efficient and fast transfer of the gas from the internal volume 20 directly inflated by the gas generator 18 into internal volumes 20 that are in fluidic communication with this internal volume 20.

The anchor straps 32, the darts and bonded patches 30, the darts 26', the restraining strap 24, the darts 26, the insert part 22 and/or similar support elements can be installed and used at other kinking points of the structural elements 16, for example at edges 34 of the housing 16, in order to prevent the undesirable folding or kinking of the structural elements 16 at such points and to ensure a fast and effective movement of the support structure 12 into the restraint position.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A restraint device for a motor vehicle, the restraint device comprising:
   a support structure with a plurality of structural elements, wherein the support structure is moveable from a stowage position into a restraint position;
   a covering configured to surround a restraint volume formed by the support structure in its restraint position; and
   at least one support element configured to hold at least one of the structural elements of the support structure in a predetermined form or position at least in the restraint position, wherein the at least one support element is substantially tubular, inherently rigid support elements.

2. The restraint device according to claim 1, wherein the at least one support element is located within the one of the structural elements.

3. The restraint device according to claim 1, wherein the at least one support element is joined by bonding or sewing to at least one of the structural elements.

4. A restraint device for a motor vehicle, the restraint device comprising:
   a support structure with a plurality of structural elements, wherein the support structure is moveable from a stowage position into a restraint position;
   a covering configured to surround a restraint volume formed by the support structure in its restraint position; and at least one support element configured to hold at least one of the structural elements of the support structure in a predetermined form or position at least in the restraint position, wherein the at least one support element is configured as a heat shield.

5. The restraint device according to claim 1, wherein the at least one support device is configured as a heat shield.

6. The restraint device according to claim 5, wherein the at least one support element is located within the one of the structural elements.

7. The restraint device according to claim 4, wherein the at least one support element is located within the one of the structural elements.

8. The restraint device according to claim 4, wherein the at least one support element is joined by bonding or sewing to at least one of the structural elements.

* * * * *